United States Patent [19]

Twardowski

[11] Patent Number: 5,587,083
[45] Date of Patent: Dec. 24, 1996

[54] NANOFILTRATION OF CONCENTRATED AQUEOUS SALT SOLUTIONS

[75] Inventor: Zbigniew Twardowski, Burnaby, Canada

[73] Assignee: Chemetics International Company Ltd., Vancouver, Canada

[21] Appl. No.: 422,935

[22] Filed: Apr. 17, 1995

[51] Int. Cl.$^6$ ............................................. B01D 61/00
[52] U.S. Cl. ........................... 210/652; 210/651; 210/653
[58] Field of Search .................................. 210/652, 651, 210/639, 805, 180, 723, 724

[56] References Cited

U.S. PATENT DOCUMENTS 4,723,603  2/1988  Plummer ................................ 166/275

OTHER PUBLICATIONS

Raman et. al., "Consider Nanofiltration For Membrane Separations", Chemical Engineering Progress, Mar. 1994, pp. 68–74.

Raltenbach et. al., "Separation Potential of Nanofiltration Membranes", Desalination, 77 (1990) 73–84.

Primary Examiner—Ana Fortuna
Attorney, Agent, or Firm—Cushman, Darby & Cushman IP Group Pillsbury Madison & Sutro, LLP

[57] ABSTRACT

A nanofiltration process using a conventional nanofiltration membrane module under a positive applied pressure is used to selectively change the concentration of one solute, such as sodium chloride or sodium chlorate providing monovalent ions, from another solute such as sodium sulfate or sodium dichromate providing multivalent ions in high salt aqueous concentrations. The process is particularly useful in favourably lowering the concentration of silica and dichromate ions in chloral kali and chlorate brine containing solutions and favourably raising the sodium sulphate level relative to sodium chloride in chloraldhali liquor. The relatively high salt concentration, surprisingly, effects little or no monovalent, particularly, $Cl^-$ rejection.

12 Claims, 1 Drawing Sheet

NANOFILTRATION OF CONCENTRATED AQUEOUS SALT SOLUTIONS

FIELD OF THE INVENTION

This invention relates to a process for reducing the concentration of undesirable compounds, particularly, solutes, in aqueous solutions by nanofiltration using a filtration membrane. More particularly, it relates to the substantial removal of sulfate, dichromate and silica divalent anions from brine solutions, optionally, containing chlorate.

BACKGROUND TO THE INVENTION

Pressure driven membrane separation processes are known wherein organic molecules or inorganic ionic solutes in aqueous solutions are concentrated or separated to various degrees by the application of a positive osmotic pressure to one side of a filtration membrane. Examples of such pressures are reverse osmosis (RO), ultrafiltration (UF) and nanofiltration (NF). These pressure driven membrane processes employ a cross-flow mode of operation wherein only a portion of a feed solution (F) is collected as a permeate solution (P) and the rest is collected as a pass solution (C). In this specification and claims, the exit process stream from the nanofiltration module, which stream has not passed through the membrane is referred to as the "pass stream". This stream is often referred to by practitioners in the membrane filtration art as the "concentrate" stream.

In the case of separation of two solutes A and B, say, NaCl and $Na_2SO_4$, the efficiency of the separation process is identified by the following parameters:

$$\% \text{ Rejection} = \frac{[A]_F - [A]_P}{[A]_F} \times 100\% \quad \text{(same relationship for solute } B\text{)}$$

$$\% \text{ Recovery} = \frac{F_P}{F_F} \times 100\%$$

$$\text{Permeate Flux} = \frac{F_F}{\text{Membrane Area}} \quad [\text{liters/min/m}^2]$$

wherein $[A]_F$ is solute A concentration in feed solution;

$[A]_P$ is solute A concentration in permeate solution;

$F_P$ is permeate solution flow; and $F_F$ is feed solution flow

When a separation of solute A from solute B is required, a high % Rejection of solute A and a low Rejection of solute B, or vice versa, high % Recovery and high Permeate Flux is desired.

Nanofiltration membranes are structurally very similar to reverse osmosis membranes in that chemically they, typically, are crosslinked aromatic polyamides, which are cast as a thin "skin layer", on top of a microporous polymer sheet support to form a composite membrane structure. The separation properties of the membrane are controlled by the pore size and electrical charge of the "skin layer". Such a membrane structure is usually referred to as a thin film composite (TFC). However, unlike RO membranes the NF membranes are characterized in having a larger pore size in its "skin layer" and a net negative electrical charge inside the individual pores. This negative charge is responsible for rejection of anionic species, according to the anion surface charge density. Accordingly, divalent anions, such as $SO_4^=$, are more strongly rejected than monovalent ones such as $Cl^-$. Commercial NF membranes are available from known suppliers of RO and other pressure driven membranes. Examples include: Desal-5 membrane (Desalination Systems, Escondido, Calif.), NF70, NF50, NF40 and NF40HF membranes (FilmTec Corp., Minneapolis, Minn.), SU 600 membrane (Toray, Japan), and NTR 7450 and NTR 7250 membranes (Nitto Electric, Japan). The NF membranes are typically packaged as membrane modules. A so-called "spiral wound" module is most popular, but other membrane module configurations such as tubular membranes enclosed in a shell or plate-and-frame type are also known.

Nanofiltration is characterized by a fractionation capacity for organic solutes with a molecular "cuboff" range of about 300 g/mol; and a fractionation capacity for multivalent vs. monovalent ions, which is especially pronounced for anions.

Nanofiltration membranes have been reported to show no or little rejection of low molecular weight organic molecules, such as, methanol, ethanol and ethyleneglycol, but a significant rejection of higher molecular weight organic species, such as glucose. Among inorganic ionic solutes, low to medium rejection has been reported for simple 1:1 electrolytes, such as NaCl or $NaNO_3$ and high rejection of other electrolytes where multivalent ionic species are involved, such as $Na_2SO_4$, $MgCl_2$ and $FeCl_3$. Such a characteristic differentiates NF from RO which rejects all ionic species, and from ultrafiltration (UF), which does not reject ionic species and only rejects organic compounds with molecular weights typically in excess of 1,000 g/tool.

Sodium chloride ($Cl^-$) finite % Rejections have been published in the following publications, namely:

(a) Desal-5 Membrane Product Application Note, publication of Desalination Systems, Inc Escondido, Calif.), April 1991, wherein the Figure on page E-19.3 shows NaCl rejection in the 55 to 85% range;

(b) NF70 Membrane, Product Specification, publication of Filmtec Corp. (Minneapolis, Minn.), cites Rejection of 60%; and (c) "Membrane Handbook", ed. by W. S. W. Ho and K. K. Sirkar, Van Norstrand Reinhold, N.Y. 1992 at Table 23.2. "Characteristics of Selected Nanofiltration Membranes", cites NaCl % Rejection of: 80% for NF70 membrane (Filmtec), 45% for NF40 membrane (Filmtec), 50% for NTF-7250 membrane (Nitto), 47% for Desal-5 membrane (Desalination Systems), and 55% for SU200HF membrane Toray).

During the NF process, a minimum pressure equal to the osmotic pressure difference between the feed/pass liquor on one side and the permeate liquor on the other side of the membrane must be applied since osmotic pressure is a function of the ionic strengths of the two streams. In the case of separation of a multivalent solute, such as $Na_2SO_4$, from a monovalent one, such as NaCl, the osmotic pressure difference is moderated by the low NaCl rejection. Usually, a pressure in excess of the osmotic pressure difference is employed to achieve practical permeate flux. In view of lower NaCl rejection, NF has been used successfully for removal of sulfate and the hardness cations, $Ca^{2+}$ and $Mg^{2+}$ from brackish waters and even seawater, without the necessity to excessively pressurize the feed stream. The reported typical pressure range for NF is 80 to 300 psi, although membrane elements are designed to withstand pressures of up to 1,000 psi.

Reported uses of NF include the aforesaid water softening, removal of dissolved multivalent ions such as $Ra^{2+}$, reduction of silica as a part of feedwater conditioning for a subsequent RO step or removal of medium of medium molecular weight organic compounds. It has also been demonstrated that high rejection of ionic species could be obtained by proper conditioning of the stream i.e. by changing its pH. Thus, effective removal (rejection) of carbonate anion could be achieved by adjusting the pH of the feed solution to about 12, to ensure that carbonate would predominantly exist as $CO_3^=$, which anion is more strongly rejected by the NF membrane than the $HCO_3^-$ ionic form.

Dissolved or suspended silica in brine feed for chloralkali processes, especially the so-called membrane chloralkali process, presents a problem in that the silica forms scale on the surface or in the interior of the ion exchange membrane separator. This causes the cell voltage and, hence, power consumption to increase. In general, in the membrane chloralkali process, the concentration of silica in the feed brine should not exceed 10 ppm, although even a lower level may be needed if some other contaminants, such as $Al^{3+}$, are present, since these contaminants enhance the scaling capacity of silica.

In other types of chloralkali and in sodium chlorate manufacturing processes, silica, if present in the feed brine also leads to insoluble deposits on the anode which also leads to increased cell voltage and a premature wear of the anode coating. In general, however, in these processes, somewhat higher levels of silica, e.g. 30 ppm or more could still be tolerated.

Silica is recognized as a difficult contaminant to remove from water and/or brine. In chloralkali practice, it is usually removed by the addition of $MgCl_2$ or $FeCl_3$ to brine, followed by pH adjustment to precipitate the respective metal hydroxide in a form of a floc. This freshly formed floc is an effective absorber for dissolved silica, which may then be separated from brine by e.g. filtration. One method combining aeration of brine, to convert Fe(II) present therein to Fe(III), which then forms $Fe(OH)_3$ floc is described in U.S. Pat. No. 4,405,463.

Use of strongly basic anion exchange membranes for silica removal from feedwater has been reported. However, the literature also recognizes that, in case there is a substantial background of other salts, the selectivity of the IX resin towards silica is greatly reduced.

Product literature from FilmTec Corp., Minneapolis, Minn. describes removal of silica from feedwater with a NF70 nanofiltration membrane, as part of a pretreatment for a subsequent RO step. A reduction of silica concentration in feedwater from 400 ppm to 50–60 ppm has been mentioned. The literature is silent, however, on use of NF methods for silica removal from higher concentration salt solutions such as chloralkali brine.

Sodium chlorate is generally prepared by the electrolysis of sodium chloride wherein the sodium chloride is electrolyzed to produce chlorine, sodium hydroxide and hydrogen. The chlorine and sodium hydroxide are immediately reacted to form sodium hypochlorite, which is then converted to chlorate and chloride under controlled conditions of pH and temperature.

In a related chemical process, chlorine and caustic soda are prepared in an electrolytic cell, which contains a membrane to prevent chlorine and caustic soda reacting and the separated chemicals are removed.

The sodium chloride salt used to prepare the brine for electrolysis to sodium chlorate generally contains impurities which, depending on the nature of the impurity and production techniques employed, can give rise to plant operational problems familiar to those skilled in the art. The means of controlling these impurities are varied and include, purging them out of the system into alternative processes or to the drain, precipitation by conversion to insoluble salts, crystallization or ion exchange treatment. The control of anionic impurities presents more complex problems than that of cationic impurities.

Sulfate ion is a common ingredient in commercial salt. When such salt is used directly, or in the form of a brine solution, and specific steps are not taken to remove the sulfate, the sulfate enters the electrolytic system. Sulfate ion maintains its identity under the conditions in the electrolytic system and thus accumulates and progressively increases in concentration in the system unless removed in some manner. In chlorate plants producing a liquor product, the sulfate ion will leave with the product liquor. In plants producing only crystalline chlorate, the sulfate remains in the mother liquor after the crystallization of the chlorate, and is recycled to the cells. Over time, the concentration of sulfate ion will increase and adversely affect electrolysis and cause operational problems due to localized precipitation in the electrolytic cells. Within the chloralkali circuit the sodium sulfate will concentrate and adversely effect the membrane, which divides the anolyte (brine) from the catholyte (caustic soda).

It is industrially desirable that sodium sulfate levels in concentrated brine, e.g., 300 g/l NaCl be reduced to at least 20 g/l in chlorate production and 10 g/l in chloralkali production.

U.S. Pat. No. 4,702,805, Burkett and Warren, issued Oct. 27, 1987, describes an improved method for the control of sulfate in an electrolyte stream in a crystalline chlorate plant, whereby the sulfate is crystallized out. In the production of crystalline sodium chlorate according to U.S. Pat. No. 4,702,805, sodium chlorate is crystallized from a sodium chlorate rich liquor and the crystals are removed to provide a mother liquor comprising principally sodium chlorate and sodium chloride, together with other components including sulfate and dichromate ions. A portion of the mother liquor is cooled to a temperature to effect crystallization of a portion of the sulfate as sodium sulfate in admixture with sodium chlorate. The crystallized admixture is removed and the resulting spent mother liquor is recycled to the electrolytic process.

It has been found subsequently, that the crystallized admixture of sulfate and chlorate obtained from typical commercial liquors according to the process of U.S. Pat. No. 4,702,805 may be discoloured yellow owing to the unexpected occlusion of a chromium component in the crystals. The discolouration cannot be removed by washing the separated admixture with liquors in which the crystallized sulfate and chlorate are insoluble. It will be appreciated that the presence of chromium in such a sulfate product is detrimental in subsequent utilization of this product and, thus, this represents a limitation to the process as taught in U.S. Pat. No. 4,702,805.

U.S. Pat. No. 4,636,376—Maloney and Carbaugh, issued Jan. 13, 1987, discloses removing sulfate from aqueous chromate-containing sodium chlorate liquor without simultaneous removal of significant quantities of chromate. The chromate and sulfate-containing chlorate liquor having a pH in the range of about 2.0 to about 6.0 is treated with a calcium-containing material at a temperature of between about 40° C. and 95° C., for between 2 and 24 hours to form a sulfate-containing precipitate. The precipitate is predominantly glauberite, $Na_2Ca(SO_4)_2$. However, the addition of calcium cations requires the additional expense and effort of the treatment and removal of all excess calcium ions. It is known that calcium ions may form an unwanted deposit on the cathodes which increases the electrical resistance of the cells and adds to operating costs. It is, typically, necessary to remove calcium ions by means of ion exchange resins.

U.S. Pat. No. 5,093,089 —Alford and Mok, issued Mar. 3, 1992 describes an improved version of the selective crystallization process of aforesaid U.S. Pat. No. 4,702,805, wherein process conditions are selected to provide precipitation of sulfate substantially free of chromium contaminant.

Typically, organic anion exchange resins have a low selectivity for sulfate anions in the presence of a large excess of chloride ions. U.S. Pat. No. 304,415,677 describes a sulfate ion absorption method, but which method has disadvantages.

The method consists of removing sulfate ions from brine by a macroporous ion exchange resin composite having polymeric zirconium hydrous oxide contained in a vessel. This method is not economical because the efficiency is low and a large amount of expensive cation exchange resin is required for carrying polymeric zirconium hydrous oxide. Further, the polymeric zirconium hydrous oxide adsorbing sulfate ions comes into contact with acidic brine containing sulfate ions, resulting in loss of polymeric zirconium hydrous oxide due to acid-induced dissolution. Soluble zirconyl ions precipitates as hydroxide in the lower portion of the vessel to clog flow paths.

U.S. Pat. No. 4,556,463—Minz and Vajna issued Dec. 3, 1984, describes a process to decrease sulfate concentration levels in brine solutions using an organic ion exchange material with brine streams under carefully controlled dilutive conditions.

U.S. Pat. No. 5,071,563—Shiga et al, issued Dec. 10, 1991, describes the selective adsorption of sulfate anions from brine solutions using zirconium hydrous oxide slurry under acidic conditions. The ion exchange compound may be regenerated by treatment with alkali.

Japanese Patent Kokai No. 04321514-A, published Nov. 11, 1992 to Kaneka Corporation describes the selective adsorption of sulfate anions from brine solutions using cerium hydroxide slurry under acidic conditions. The ion exchange compound may be regenerated by treatment with alkali.

Japanese Patent Kokai No. 04338110-A—Kaneka Corporation, published Nov. 25, 1992 describes the selective adsorption of sulfate anions from brine solutions using titanium hydrous oxide slurry under acidic conditions. The ion exchange compound may be regenerated by treatment with alkali.

Japanese Patent Kokai No. 04334553-A—Kaneka, published Nov. 11, 1992 describes the removal of sulfate ions from brine using ion-adsorbing cakes in a slurry.

There still remains, however, a need for an improved, cost-effective, practical method for the removal of sulfate, silica and chromium (VI) ions from alkali metal halide solutions, particularly, from sodium chloride solutions used in the electrolytic production of sodium chlorate and chlorine/caustic soda.

SUMMARY OF THE INVENTION

It is an object of the present invention to provide a process of changing the ratio of the concentration of two or more compounds in an aqueous liquor so as to obtain substantially complete or partial removal of one compound from the another in the liquor.

It is a further object of the invention to provide a process of reducing the concentration of sodium sulfate in a brine liquor or a brine/chlorate liquor.

Accordingly, in its broadest aspect the invention provides in a nanofiltration process for filtering an aqueous liquor comprising feeding a feed liquor to a nanofiltration membrane module under a positive pressure to provide a pass liquor and a permeate liquor for selectively changing the concentration of a first compound relative to the concentration of a second compound in said aqueous liquor wherein said first compound has a first feed concentration and said second compound has a second feed concentration, said process comprising feeding said aqueous liquor to said nanofiltration membrane module, collecting said pass liquor wherein said first compound is at a first pass concentration and said second compound is at a second pass concentration, and collecting said permeate liquor wherein said first compound has a first permeate concentration and said second compound is at a second permeate concentration, the improvement comprising said first compound having a first concentration of greater than 50 g/l.

Thus, surprisingly I have found that nanofiltration membrane processes can be used to beneficially reduce the concentration of multivalent ions, such as $SO_4^=$, $CrO_4^=$ or $Cr_2O_7^=$ and dissolved silica in concentrated solutions of sodium chloride, such as brine, and concentrated sodium chlorate process liquors where the main components are sodium chlorate and sodium chloride.

I have most surprisingly found, notwithstanding the teachings that commercially available nanofiltration membranes have a monocharged anion rejection property, e.g. a $Cl^{31}$ ion rejection in the range 20–50%, that such membranes when used with concentrated salt solutions exhibit no $Cl^-$ ion rejection. This unexpected absence of chloride rejection by the nanofiltration membrane has a significant practical importance in minimizing the osmotic pressure across the membrane and hence the energy required for pressurizing the feed to achieve a given permeate flow. Further, in surprising contrast, the rejection of multivalent ions such as $SO_4^=$, $CrO_4^=$ or $Cr_2O_7^=$ and also silica remains high.

Accordingly, such unexpected ion membrane selectivity at relatively high salt concentrations offers attractive applications such as, for example, in the treatment of chloralkali brine liquors having sodium sulfate levels unacceptable in recycle systems. As illustrated in an application of sulfate removal from brine, because there is no buildup in concentration of sodium chloride in the pass liquor stream over its original level in the feed stream, it is possible to increase the content of sodium sulfate in the pass liquor to a higher level than would have been possible if the NaCl level of the pass liquor had increased. Accordingly, it is now possible to realize a desirable high % Recovery, and, in the case of chloralkali brine, to minimize the volume of brine purge, and/or the size of a reactor and the amount of chemicals for an, optional, subsequent sulfate precipitation step.

Accordingly, in a further aspect the invention provides a process as hereinabove defined wherein said first solute is sodium chloride and said second solute is sodium sulfate.

Preferably, the sodium chloride is at a concentration of greater than 50 g/l, more preferably greater than 100 g/l and yet more preferably in the range 150–350 g/l, and wherein the sodium sulfate concentration is greater than 0.25 g/l, preferably 5–40 g/l.

In a further aspect, the invention provides a process for the selective removal of sulfate anion from sodium chloride liquors as hereinabove defined further comprising sodium chlorate, as obtained in the manufacture of sodium chlorate.

In yet further aspects, the invention provides processes as hereinabove defined wherein the concentrated sodium chloride liquors comprise silica as a contaminant or have unacceptable levels of $CrO_4^=$ or $Cr_2O_7^=$.

In still yet further aspects of the invention there is provided beneficial nanofiltration processes for reducing the concentration of multivalent species and/or organic solutes with a molecular weight of 200 or more from matrices of concentrated solutions of acids, bases, salts, mixtures of acids and salts and mixtures of bases and salts which concentration is at least 50 g/l as total dissolved solids or acids. Some of such applications of industrial significance are listed as follows.

Removal of multivalent metals from brine. Also from acids such as $H_2SO_4$, $HNO_3$, HCl, HF or mixtures thereof such as galvanic wastewater, metal cleaning, metal etching and the like.

Separation of NaCl from $Na_2SO_4$ and $Na_2CO_3$ in a dissolved precipitator catch from a recovery boiler in a Kraft pulp mill. Removal of chlorides is required to reduce the corrosivity of recovered process chemical streams within a Kraft mill which is substantially closed, i.e. effluent free.

Purification of fertilizer grade of orthophosphoric acid from heavy metals to make it suitable for technical application, i.e. upgrading to technical grade acid. Recovery of $H_2SO_4$ and $HNO_3$ from spent nitration acid. Here the nitrated organic byproducts remain in the pass liquor stream, while purer and desired acids are collected as a permeate.

Separation of phenolic salts from a product rinse water during production of nitrobenzenes, nitrotoluenes, nitroxylenses and other nitroorganic compounds.

Segregation of sodium sesquisulfate solution, $Na_3H(SO_4)_2$ into $Na_2SO_4$ in the pass liquor stream and $NaHSO_4$ in the permeate. The latter could be used within a pulp mill as an acid, e.g. for generation of $ClO_2$ or in an acidulation step to produce a tall oil.

Fractionation of White Liquor into a $Na_2S$-rich pass liquor and a NaOH-rich permeate fraction.

It will be readily understood that the present invention may be practised in systems involving aqueous solutions containing more than two solutes provided selectivity characteristics as between the individual solutes are appropriate and suitable for desired selective separations or concentrations.

The processes of the invention as hereinabove defined may further comprise further treatment of the pass liquor or the permeate liquor. For example, the pass liquor of the above chloralkali brine—sodium sulfate liquor may be, for example, either treated with calcium chloride or barium chloride to effect precipitation of calcium sulfate or barium sulfate, or to effect fractional crystallization by cooling directly or after partial evaporation of water.

The process is of particular value with spent dechlorinated brine as feed liquor. It is also of value using a chlorate liquor containing unwanted amounts of sulfate and/or chromate or dichromate. Such chlorate liquor may be obtained as crystallizer mother liquor or from other sources in a sodium chlorate manufacturing plant circuit, including the brine feed.

In the case of the removal of unwanted materials such as silica anions which are capable of being present as monovalent species, it is highly desirable that the pH of the liquor be adjusted, where appropriate, to maximize the concentration of the di- or higher valent anions of that species. For example, aqueous silica species should be converted to $SiO_3^{=}$ and other divalent anions rather than $HSiO_3^{-}$ or other monovalent anions. Similarly, $SO_4^{=}$ anion concentration should be optimized over $HSO_4^{-}$.

The processes of the invention are applicable as either simple stage batch processes with optional recycle of either pass liquor or permeate liquor to the nanofiltration membrane module, or as part of a multi-stage, multi-module system.

The processes of the invention as hereinabove defined may be operated at any suitable and desired temperature selected from 0° C. to the boiling point of the feed liquor; and positive pressures applied to the feed side, generally selected from 50–1200psi.

BRIEF DESCRIPTION OF THE DRAWINGS

In order that the invention may be better understood, preferred embodiments will now be described by way of example only with reference to the accompanying drawing wherein.

DETAILED DESCRIPTION OF

PREFERRED EMBODIMENTS OF THE INVENTION

Figure 1:
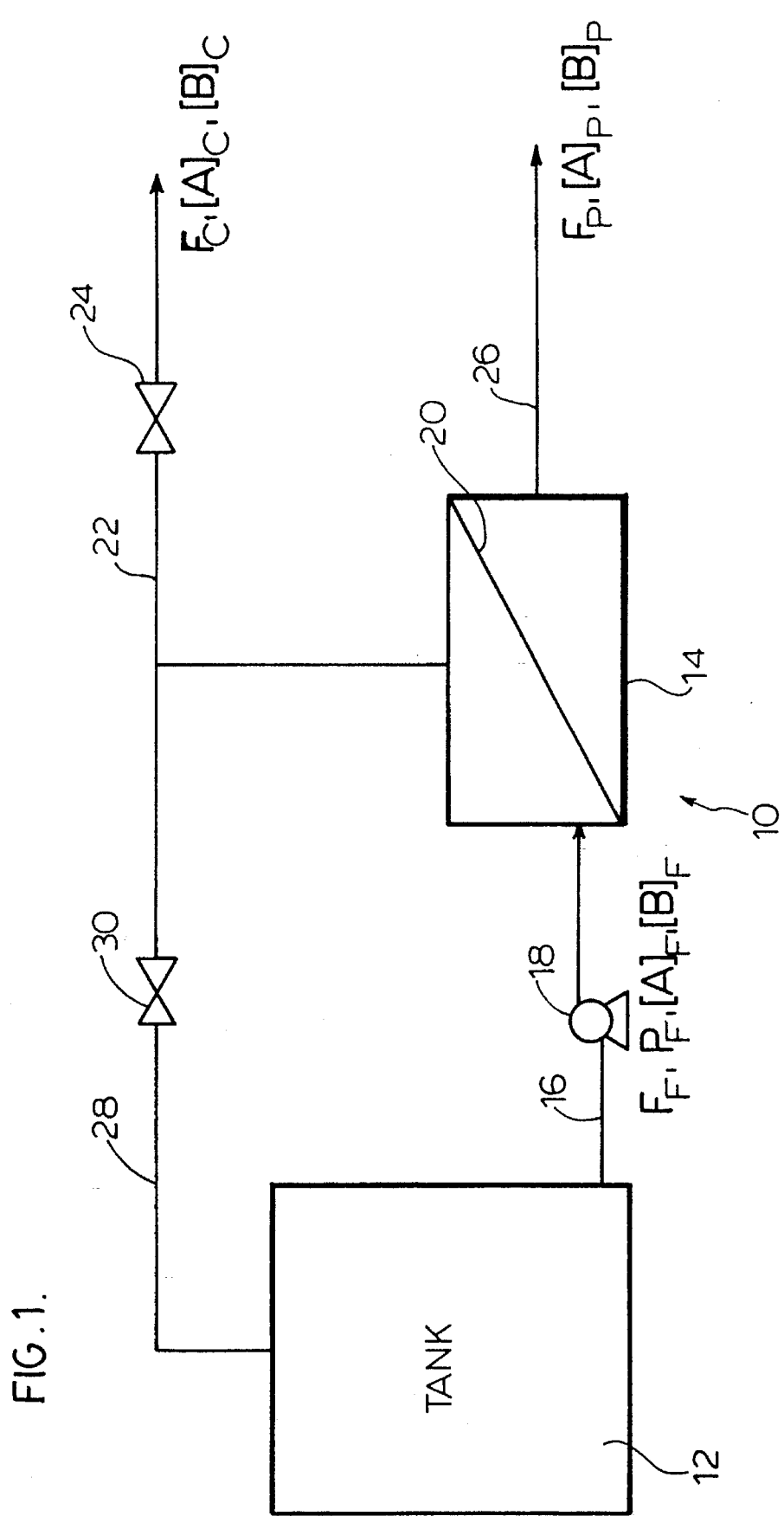
FIG. 1 represents a diagrammatic flow sheet of a single stage membrane nanofiltration system of use in a process according to the invention.

FIG. 1 shows generally as 10, a single stage membrane nanofiltration system for the separation of, for example, solute A from solute B in an aqueous liquor. System 10 comprises a feed solution holding tank 12 connected to a nanofiltration membrane module 14 by a feed conduit 16 though a high pressure pump 18 (Model I-2401, CID Pumps Inc.) Module 14 comprises a single spiral wound type nanofiltration module containing Desal-5, DL2540 polyamide membrane 20 having 2.5m$^2$ of active membrane area. Exiting module 14 is a pass liquor conduit 22 having a pressure control valve 24 and a permeate liquor conduit 26.

System 10 has a pass liquor recycle conduit 28 controlled by a valve 30, which, optionally, is used when recycle of the feed/pass liquor to tank 12 is desired.

In operation, aqueous feed liquor containing solute A and solute B at feed concentrations $A_F$, and $B_F$, respectively, are passed to module 14 under a high pressure of 400±psi, feed solution pressure $P_F$, by pump 18, at a feed solution flow rate of $F_F$.

Exiting through conduit 22 is pass liquor at a flow rate $F_c$ containing solutes A and B at pass liquor concentrations of $A_C$ and $B_C$, respectively. Exiting through conduit 26 is permeate liquor at a flow rate of $F_P$ containing solutes A and B at permeate liquor concentrations of $A_P$ and $B_P$, respectively.

The process depicted in FIG. 1 represents a single stage or batch-type process, wherein the pass liquor or the permeate liquor may be of sufficient and desired quality for use in a subsequent process or discharge. However, each of the pass and permeate streams, optionally, individually, may be sent through a nanofiltration membrane process again, in one or more cycles, in either a batch or continuous processes. In industrial processes of use in the practise of the invention, the pass stream from the first stage may be sent to the second stage to increase the overall % Recovery. Alternatively, the NF process may be conducted in a batch mode with the pass liquor recycled back to the feed tank. Accordingly, in consequence, the feed composition will vary with time as will the Membrane Flux and possibly the % Rejection.

The following Examples illustrate specific compounds used in the process as described by FIG. 1.

Example 1

A batch of 80 liters of brine solution containing 196.0 grams/liter NaCl and 9.45 grams/liter $Na_2SO_4$ at a temperature of 50° C. was added to tank 12. High pressure pump 18 was turned on and the pressure on the feed side was adjusted to 400±5 psi and kept constant during the run. Both permeate and pass liquor streams were collected into separate tanks over a period of 11.5 minutes. Both the permeate and the pass liquor flow rates were approximately constant during the run at about 2.0 lpm and 3.3 lpm, respectively. Following the run, 25 l of permeate with a composition of 190.1 gpl NaCl and 0.25 gpl $Na_2SO_4$ and 34 l of concentrate with a composition of 190.7 gpl NaCl and 15.3 gpl $Na_2SO_4$ were collected while 20 l of the feed brine remained in the feed tank. Calculated NF membrane % Rejections are: 97.3% for $Na_2SO_4$ and 3.0% for NaCl.

The approximate mass balances are shown as follows wherein the volumes of liquor are within ±2 liters.

|  | Concentration (g/l) | Volume (l) | Amount (Kg) | Concentration Ratio* |
|---|---|---|---|---|
| Feed Liquor |  |  |  |  |
| NaCl | 196 | 60 | 11.76 | 20.7 |
| $Na_2SO_4$ | 9.45 | 60 | 0.57 |  |
| Pass Liquor |  |  |  |  |
| NaCl | 190.7 | 34 | 6.48 | 12.4 |
| $Na_2SO_4$ | 15.3 | 34 | 0.52 |  |
| Permeate Liquor |  |  |  |  |
| NaCl | 190.1 | 25 | 4.75 | 760 |
| $Na_2SO_4$ | 0.25 | 25 | 0.06 |  |

*NaCl:$Na_2SO_4$

Example 2

A similar process was carried out under the same conditions as for Example 1, wherein the volume of feed brine was 76 liters containing 195.9 gpl NaCl and 18.0 gpl $Na_2SO_4$. After 10 minutes of operation with a feed pass pressure maintained at 400±5 psi, 18 l of permeate and 38 l of concentrate were collected while 19 l of the feed brine remained in the feed tank. The composition of the permeate was 194.7 gpl NaCl and 0.37 gpl $Na_2SO_4$. The composition of concentrate was 192.0 gpl NaCl and 26.3 gpl $Na_2SO_4$. Calculated NF membrane % Rejections are: 97.9% for $Na_2SO_4$ and 0.6% for NaCl.

|  | Concentration (g/l) | Volume (l) | Amount (Kg) | Concentration Ratio* |
|---|---|---|---|---|
| Feed Liquor |  |  |  |  |
| NaCl | 195.9 | 57 | 11.17 | 10.9 |
| $Na_2SO_4$ | 18.0 | 57 | 1.03 |  |
| Pass Liquor |  |  |  |  |
| NaCl | 192 | 38 | 7.30 | 7.3 |
| $Na_2SO_4$ | 26.3 | 38 | 1.00 |  |
| Permeate Liquor |  |  |  |  |
| NaCl | 194.7 | 18 | 3.50 | 526 |
| $Na_2SO_4$ | 0.37 | 18 | 0.06 |  |

*NaCl:$Na_2SO_4$

Example 3

In this example a recycle batch mode of operation was carried out wherein the pass stream was recycled back to the brine feed tank. A starting volume of feed brine was 76 l having a composition of 197.5 gpl NaCl and 16.7 gpl $Na_2SO_4$. The flow rate of permeate was kept constant at 1.3 lpm. The resulting feed pass pressure was initially at 295 psi and at the end of the process at 315 psi. After 45.5 minutes 50 l of permeate were collected while the volume in the brine feed tank decreased to 25 l. The composition of permeate was 200.4 gpl NaCl and 0.38 gpl $Na_2SO_4$. The composition of brine solution remaining in the feed tank was 188.4 gpl NaCl and 44.8 gpl $Na_2SO_4$. The calculated NF membrane % Rejections were 97.7% for $Na_2SO_4$ and −1.5% for NaCl.

|  | Concentration (g/l) | Volume (l) | Amount (Kg) | Concentration Ratio* |
|---|---|---|---|---|
| Feed Liquor |  |  |  |  |
| NaCl | 197.5 | 76 | 15.01 | 11.83 |
| $Na_2SO_4$ | 16.7 | 76 | 1.27 |  |
| Pass Liquor |  |  |  |  |
| NaCl | 188.4 | 25 | 4.71 | 4.21 |
| $Na_2SO_4$ | 44.8 | 25 | 1.12 |  |
| Permeate Liquor |  |  |  |  |
| NaCl | 200.4 | 50 | 10.02 | 526 |
| $Na_2SO_4$ | 0.38 | 50 | 0.02 |  |

*NaCl:$Na_2SO_4$

Example 4

A recycle batch process similar to that of Example 3 was carried out with a liquor further containing silica and having a pH of 10.7. The initial volume of brine feed solution was 75 l and had a composition of 246.9 gpl NaCl, 30.0 gpl $Na_2SO_4$ and 9.1 ppm $SiO_2$. The feed pass liquor pressure was kept constant at 320±5 psi. After 64 minutes 50 l of permeate was collected while the volume of solution in the feed tank decreased to 24 l. The composition of permeate was 257.5 gpl NaCl, 0.85 gpl $Na_2SO_4$ and 5.5 ppm $SiO_2$. The composition of brine solution remaining in the feed tank was 240.5 gpl NaCl, 79.8 gpl $Na_2SO_4$ and 15.1 ppm $SiO_2$. The calculated Nf membrane % Rejections were 97.2% for $Na_2SO_4$, −4.3% for NaCl and 39.6% for $SiO_2$.

|  | Concentration (g/l) | Volume (l) | Amount (Kg) | Concentration Ratio* |
|---|---|---|---|---|
| Feed Liquor |  |  |  |  |
| NaCl | 246.9 | 75 | 18.52 | 8.23 |
| $Na_2SO_4$ | 30.0 | 75 | 2.25 |  |
| $SiO_2$ | 9.1 (ppm) | 75 | $6.8 \times 10^{-4}$ parts |  |
| Pass Liquor |  |  |  |  |
| NaCl | 240.5 | 24 | 5.77 | 3.01 |
| $Na_2SO_4$ | 79.8 | 24 | 1.92 |  |
| $SiO_2$ | 15.1 (ppm) | 24 | $3.62 \times 10^{-4}$ parts |  |

-continued

| | Concentration (g/l) | Volume (l) | Amount (Kg) | Concentration Ratio* |
|---|---|---|---|---|
| Permeate Liquor | | | | |
| NaCl | 257.5 | 50 | 12.88 | 303 |
| $Na_2SO_4$ | 0.85 | 50 | 0.04 | |
| $SiO_2$ | 5.5 (ppm) | 50 | $2.75 \times 10^{-4}$ parts | |

*$NaCl:Na_2SO_4$

Example 5

This example illustrates the simultaneous reduction in sulfate and chromium (VI) concentration in a sodium chlorate feed liquor solution.

A bath of 75 l of chlorate liquor feed solution containing 395 gpl $NaClO_3$, 101.1 gpl NaCl, 20.8 gpl $Na_2SO_4$, 5.1 gpl $Na_2Cr_3O_7$ at a pH of 7 and a temperature of 45° C. was added to tank 12. The high pressure on the feed side was adjusted to 505±10 psi and kept constant during the run. Both permeate and pass liquor streams were collected into separate tanks over a period of 91 minutes. In total, 20 l of permeate liquor and 10 l of pass liquor were collected, while about 44 l of feed solution remained in tank 12 at the end of the run. The calculated average permeate liquor and concentrate liquor flows were 0.22 lpm and 0.11 lpm, respectively. Subsequent chemical analysis revealed that the permeate liquor had 398 gpl $NaClO_3$, 101.5 gpl NaCl, 4.1 gpl $Na_2SO_4$ and 2.0 gpl $Na_2Cr_2O_7$, while the pass stream had 380 gpl $NaClO_3$, 96 gpl NaCl, 48.8 gpl $Na_2SO_4$ and 9.5 gpl $Na_2Cr_2O_7$. Calculated NF membrane % Rejections were: −0.4% for NaCl, −0.7% for $NaClO_3$, 80.3% for $Na_2SO_4$ and 60.8% for $Na_2Cr_2O_7$.

| | Concentration (g/l) | Volume (l) | Amount (Kg) | Concentration Ratio |
|---|---|---|---|---|
| Feed Liquor | | | | |
| $NaClO_3$ | 395.0 | 31 | 12.24 | 4.86* |
| NaCl | 101.1 | 31 | 3.13 | 19.0** |
| $Na_2SO_4$ | 20.8 | 31 | 0.64 | 77.5*** |
| $Na_2Cr_2O_7$ | 5.1 | 31 | 0.16 | 19.8**** |
| Pass Liquor | | | | |
| $NaClO_3$ | 380.0 | 10 | 3.8 | 1.96* |
| NaCl | 96.0 | 10 | 0.96 | 7.78** |
| $Na_2SO_4$ | 48.8 | 10 | 0.49 | 40.0*** |
| $Na_2Cr_2O_7$ | 9.5 | 10 | 0.09 | 10.0**** |
| Permeate Liquor | | | | |
| $NaClO_3$ | 398.0 | 20 | 7.96 | 24.8* |
| NaCl | 101.5 | 20 | 2.03 | 97.0** |
| $Na_2SO_4$ | 4.1 | 20 | 0.08 | 199.0*** |
| $Na_2Cr_2O_7$ | 2.0 | 20 | 0.04 | 51.0**** | wherein:—
*$NaCl:Na_2SO_4$
**$NaClO_3:Na_2SO_4$
***$NaClO_3:Na_2Cr_2O_7$
****$NaCl:Na_2Cr_2O_7$ Although this disclosure has described and illustrated certain preferred embodiments of the invention, it is to be understood that the invention is not restricted to those particular embodiments which are functional or mechanical equivalence of the specific embodiments and features that have been described and illustrated.

I claim:

1. In a nanofiltration process for filtering an aqueous liquor comprising feeding a feed liquor to a nanofiltration membrane module under a positive applied pressure to provide a pass liquor and a permeate liquor and selectively decreasing the concentration of a first compound relative to the concentration of a second compound in said aqueous liquor wherein said first compound has a first feed concentration and said second compound has a second feed concentration, said process comprising feeding said aqueous liquor to said nanofiltration membrane module, collecting said pass liquor wherein said first compound is at a first pass concentration lower than said first feed concentration, and said second compound is at a second pass concentration higher than said second feed concentration, and collecting said permeate liquor wherein said first compound has a first permeate concentration and said second compound is at a second permeate concentration, the improvement wherein said first feed compound has a first feed concentration greater than 50 g/l, wherein said first feed compound contains monovalent ions, and said second feed compound contains polyvalent ions.

2. A process as defined in claim 1 wherein said first compound is sodium chloride and said second compound is sodium sulfate.

3. A process as defined in claim 2 wherein said feed liquor further comprises sodium chlorate.

4. A process as defined in claim 3 wherein said first feed liquor further contains a divalent anion of chromium.

5. A process as defined in claim 3 wherein said feed liquor comprises sodium chlorate plant liquor.

6. A process as defined in claim 2 wherein said first feed concentration of said sodium chloride is greater than 100 g/l.

7. A process as defined in claim 6 wherein said first feed concentration of said sodium chloride is selected from the range 150–350 g/l.

8. A process as defined in claim 1 wherein said feed liquor further comprises silica.

9. A process as defined in claim 8 further comprising adjustment of the pH to provide substantially divalent silica anion.

10. A process as defined in claim 1 wherein said pass liquor or said permeate liquor is recycled back to said nanofiltration membrane module.

11. A process as defined in claim 1 further comprising treatment of said pass liquor to effect precipitation of sulfate ion as calcium sulfate, barium sulfate or sodium sulfate by addition of a calcium compound; or by water removal by evaporation.

12. A process as defined in claim 1 wherein said feed liquor is spent dechlorinated brine.

* * * * *